April 2, 1968  E. J. HERBENAR  3,376,058
JOINT WITH CONTOURED PLUG CLOSURE
Filed July 21, 1965
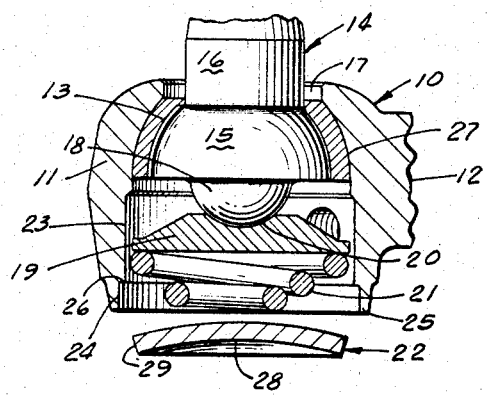
Fig-1
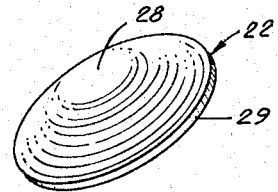
Fig-2
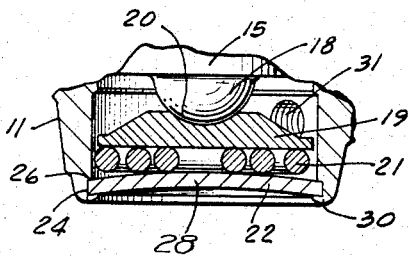
Fig-3
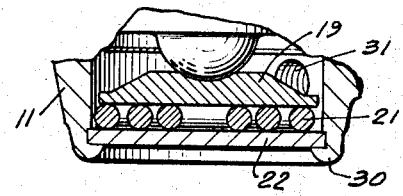
Fig-4
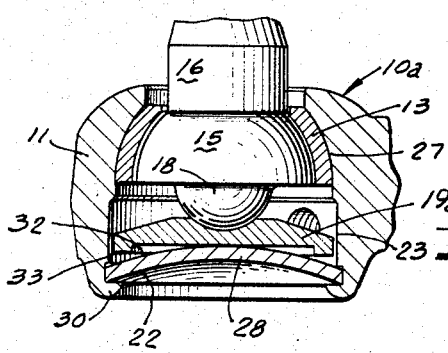
Fig-5
Fig-6
INVENTOR.
EDWARD J. HERBENAR
BY Hill, Sherman, Meroni, Gross & Simpson
ATTORNEYS

United States Patent Office 3,376,058
Patented Apr. 2, 1968

3,376,058
JOINT WITH CONTOURED PLUG CLOSURE
Edward J. Herbenar, Detroit, Mich., assignor to TRW Inc., Cleveland, Ohio, a corporation of Ohio
Filed July 21, 1965, Ser. No. 473,763
4 Claims. (Cl. 287—90)

ABSTRACT OF THE DISCLOSURE

A ball and socket joint having the socket closed by an inwardly bowed disk engaging a joint component with a spring force to maintain the joint components in proper bearing relation and to take-up wear developed in use of the joint. The inwardly bowed closure member may act directly on a seat for the ball stud or through an interposed spring to provide an added spring force for taking up wear and for maintaining the joint components in properly seated engagement.

---

This invention relates to joint assemblies with socket closure devices serving an added function of a take-up spring for the joint components. Particularly, the invention deals with ball and socket joints where the socket is closed by a contoured disk accommodating wide variations in stack-up height for the joint components in the socket and serving as a wear take-up spring either alone or in series with a conventional take-up spring.

The invention will hereinafter be described as embodied in a ball and socket joint suitable for tie rod ends of automotive steering linkages and the like, but it should be understood that the principles of this invention are generally applicable to assemblies having closure members serving a dual function of maintaining component parts in proper engagement and oriented relation.

According to the preferred embodiment of the invention, a ball and socket joint has the socket closed by a contoured disk adapted to be deflected from its free state form to provide a spring effect on the joint stud either in series relation with a wear take-up spring or solely providing the spring effect on the stud. In one form the conventional wear take-up spring urges a retainer against the stud to maintain the stud head in proper bearing engagement with its seating surfaces in the socket or housing. This wear take-up spring is bottomed on a convex closure disk which is spun into the open bottom of the housing and which can be deflected from its free state convex shape to a more flattened shape which will tend to reclaim its free state and add spring effect to the wear take-up spring.

The flattening of the convex closure disk also accommodates wide variations in stack-up heights for the joint components in the socket.

In another form of the invention the wear take-up spring is eliminated and the contoured closure disk acts directly on the retainer engaging the stud. In this arrangement the disk forms the sole wear take-up spring for the joint. The spring retainer or seat can be provided with a relief area preventing the closure disk from ever attaining a flat neutral position thereby eliminating the possibility of reverse bowing of the disk to lose any spring take-up effect.

It is then an object of this invention to provide a wear take-up means for stacked components which serve a dual function of a wear take-up spring and closure member.

Another object of the invention is to provide a ball and socket type joint with a contoured socket closure disk serving an added function of a wear take-up spring.

A specific object of the invention is to provide a wear take-up type ball and socket joint with a convex closure disk bottoming the wear take-up spring and deflectable to add spring force to the wear take-up spring.

A still further specific object of this invention is to provide a ball and socket joint with a convex closure disk for the joint socket which acts directly on a spring seat for the joint stud and provides wear take-up capacity for the joint.

A still further specific object of the invention is to provide a ball and socket joint with a spring seat having a relieved central portion bottomed on a convex closure disk which serves as a wear take-up spring and which is prevented from assuming a flat neutral position by the relief provided in the seat.

Other and further objects of the invention will be apparent to those skilled in this art from the following detailed description of the annexed sheet of drawings which, by way of preferred examples illustrate several embodiments of the invention.

On the drawings:

FIGURE 1 is a fragmentary vertical cross sectional view, with parts in elevation, of the components of a ball and socket joint prior to closure of the joint socket.

FIGURE 2 is an isometric view of the convex closure disk for the socket of FIGURE 1.

FIGURE 3 is a fragmentary cross sectional view similar to FIGURE 2 but showing the closure disk secured in the socket and retaining a convex position.

FIGURE 4 is a view similar to FIGURE 3 but showing the closure disk in a flattened condition.

FIGURE 5 is a cross sectional view of a contoured closure disk and spring seat for joints of this invention wherein the seat is relieved to receive the closure disk directly thereagainst.

FIGURE 6 is a view similar to FIGURES 3 and 4 but showing the closure disk and spring seat arrangement of FIGURE 5 in the assembly.

As shown on the drawings:

In FIGURE 1 the reference numeral 10 designates generally a ball and socket joint assembly composed of an open-ended socket 11 with a laterally extending stem 12, a fragmental spherical bearing seat 13 in the socket, a stud 14 having a fragmental spherical head 15 seated in the seat 13 and a generally cylindrical stem 16 projecting from the head freely through an aperture 17 in the top of the socket 11. The head 15 has a centrally depending fragmental spherical button 18 extending therefrom and seated in a spring seat disk 19. The disk 19 has a central recess 20 receiving the bottom of the button 18. A coil spring 21 acts on the spring seat 19 and the convex closure disk 22 of this invention is provided for bottoming the spring and for closing the open bottom of the socket.

The designation of the disk 22 as "convex" of course refers to the convex active face thereof which bottoms the spring 21. The opposite or outer face of the disk 22 is concave and, therefore, the full disk shape may be designated as "convexo-concave."

The socket 11 has a generally cylindrical bore 23 with a larger diameter counterbore 24 at the bottom end thereof providing a rim 25 terminating in an internal radial shoulder 26. The cylindrical bore extends to a fragmental spherical bearing wall 27 in the upper part of the socket which converges to the opening 17 in the top of the socket. The bearing member 13 has fragmental spherical inner and outer bearing walls respectively engaging the socket wall 27 and the stud head 15. The stud 14 rotates in the bearing 13 and tilts with the bearing on the housing wall 27.

The convex or convexo-concave closure disk 22 is composed of steel having a slight spring effect and is bowed upwardly to a central apex 28. The disk has a circular periphery 29 of smaller diameter than the counterbore 24 so that the disk fits freely in this counterbore to be bottomed against the shoulder 26.

As shown in FIGURE 1 the free state stacked height of the joint components is such that the unloaded spring 21 extends into the counterbore 24. However, as shown in FIGURE 3, when the closure disk 22 is bottomed against the shoulder 26 of the counterbore the spring 21 is flattened with its small end coil engaging the domed portion 28 of the disk 22. The disk 22 is secured in the counterbore against the shoulder 26 by spinning over the housing part 25 to provide a retaining lip 30 underlying the periphery of the disk. The disk of FIGURE 3 is partially flattened from its free state condition of FIGURES 1 and 2 but still retains a convex shape addressing the spring. The somewhat flattened disk adds spring force to the spring 21 and acts in series with the spring.

In the arrangement shown in FIGURE 4 the stacked height of the joint components is such that the disk 22 has reached a flat condition but, of course, will tend to reclaim its convex free state condition thereby also adding spring force to the spring 21.

FIGURES 2 and 3 therefore show stacked height tolerances of the joint components which can be accommodated by the convex disk without loss of spring force.

The crimped-in shoulder 30 underlying the periphery of the closure disk 22 coacts with the disk and with the bore 24 and shoulder 26 to tightly seal the disk to the socket thereby preventing leakage and looseness of parts. The joint can then be filled with lubricant through a tapped lubricant passageway 31 in the socket wall.

In the assembly shown in FIGURE 5 the spring seat 19a has a recessed bottom 32 receiving the dome portion 28 of the closure disk 22 and the depending rim 33 surrounding the recess, in the free state height of the assembly is spaced above the disk.

In the modified joint 10a of FIGURE 6, the assembly of FIGURE 5 is used in place of the seat, spring and disk assembly of FIGURES 3 and 4, the spring 21 being entirely eliminated. In joint 10a parts identical with parts described in FIGURES 1 to 4 have been marked with the same reference numerals. As shown in FIGURE 6 the convex closure disk 22 acts directly on the modified spring seat 19a in the recess 32 thereof and exerts spring action thereagainst to urge the joint components into proper bearing relation in the socket. However, it will be apparent from FIGURE 6 that when the disk 22 is flattened sufficiently so that the rim 33 of the seat 19a will engage the disk, the relief portion 32 will still provide for a convex contour of the disk. Therefore, the disk 22 cannot assume the flat condition of FIGURE 4 with attendant loss of spring capacity. A minimum contour depth is therefore always maintained for the closure disk 22 determined by the depth of the recess 32 in the modified spring seat 19a.

In the arrangement of FIGURE 4, utilizing the spring 21, it will be understood that the large diameter coil spring transfers the working load from the spring seat to the outer working edge of the disk and a neutral flat position for the disk could not be obtained. FIGURE 4 is intended to illustrate only the manner in which the disk could be flattened to accommodate maximum stack-up heights of the components.

From the above descriptions it will therefore be understood that this invention provides a wear take-up closure disk arrangement for assembled components particularly in ball and socket joints.

Although minor modifications might be suggested by those versed in the art, it should be understood that I wish to embody within the scope of the patent warranted hereon, all such modifications as reasonably and properly come within the scope of my contribution to the art.

I claim as my invention:

1. A ball and socket joint which comprises a socket, a bearing in the socket, a ball stud having a head seated in the bearing and a shank extending from the socket, a button end on the stud head, a spring seat having a recess receiving the button end, a coil spring in the socket bottoming the spring seat, a convex closure disk bowed inwardly toward the interior of the socket closing the bottom of the socket and bottoming the coil spring on said inwardly bowed surface thereof, said disk having a spring force vector coacting in series with the spring to provide wear takeup for the joint components.

2. A ball and socket joint which comprises a socket, a ball stud assembly tiltably and rotatably mounted in the socket, a spring seat bottoming the stud in the socket, a coil spring acting on the seat, said socket having a counterbore with an internal radial shoulder, a convex closure disk seated in said counterbore against said shoulder, a lip spun under the periphery of the disk anchoring the disk against the shoulder, and said disk having a dome bowed inwardly toward the interior of the socket which engages the spring to provide an added spring force for taking up wear of the joint components.

3. A ball and socket joint which comprises a socket, a ball stud seated in said socket and tiltable and rotatable in the socket, a rigid spring seat engaging the ball stud and slidably disposed in said socket, a convex closure disk having its peripheral edge secured in the end of the socket and bowed inwardly from its peripheral edge toward the interior of the socket, said spring seat having a recessed central portion receiving the inwardly bowed domed apex of the closure disk, and said disk exerting spring force through the seat to the stud for maintaining the ball stud in bearing engagement in the socket.

4. A ball and socket joint which comprises a socket, a bearing in the socket, a stud having a ball head seated in said bearing and tiltable and rotatable relative to the socket, a rigid spring seat member freely disposed in the socket and having a complementary recess receiving said ball head to accommodate rotation and tilting of the stud relative to said seat member, a convex closure disk having its peripheral edge secured in the end of the socket and bowed inwardly from its peripheral edge toward the interior of the socket to provide a domed portion engaging said rigid spring seat member, and said disk having the curvature of its dome reduced from its free state shape and engaging said spring seat member to exert a spring force against said rigid spring seat member for urging the stud into seated engagement with the bearing and to take up wear of the joint components.

References Cited

UNITED STATES PATENTS

| 2,528,221 | 10/1950 | Flumerfelt | 287—90 |
| 2,701,151 | 2/1955 | Booth | 287—90 |
| 3,290,074 | 12/1966 | Korecky | 287—90 |

FOREIGN PATENTS

| 527,207 | 5/1955 | Italy. |
| 644,228 | 4/1937 | Germany. |
| 483,279 | 5/1952 | Canada. |
| 873,021 | 4/1953 | Germany. |
| 796,706 | 6/1958 | Great Britain. |

CARL W. TOMLIN, *Primary Examiner.*

ANDREW KUNDRAT, *Assistant Examiner.*